United States Patent [19]

Weber et al.

[11] 3,972,028
[45] July 27, 1976

[54] DATA PROCESSING SYSTEM INCLUDING A PLURALITY OF MEMORY CHIPS EACH PROVIDED WITH ITS OWN ADDRESS REGISTER

[75] Inventors: Gerald Weber; Jürgen Sorgenfrei, both of Braunschweig, Germany

[73] Assignee: Olympia Werke AG, Wilhelmshaven, Germany

[22] Filed: Dec. 20, 1974

[21] Appl. No.: 535,089

[30] Foreign Application Priority Data
Dec. 22, 1973 Germany............................ 2364408

[52] U.S. Cl. ............................................. 340/172.5
[51] Int. Cl.[2] ........................................ G06F 13/00
[58] Field of Search ..................... 340/172.5, 173 R

[56] References Cited
UNITED STATES PATENTS

| | | | |
|---|---|---|---|
| 3,691,538 | 9/1972 | Haney ............................ | 340/173 R |
| 3,757,306 | 9/1973 | Boone ............................. | 340/172.5 |
| 3,813,650 | 5/1974 | Hunter ............................ | 340/172.5 |
| 3,821,715 | 6/1974 | Hoff, Jr. ......................... | 340/172.5 |
| 3,855,577 | 12/1974 | Vandierendonck .............. | 340/172.5 |

OTHER PUBLICATIONS

"Intel MCS-4 Micro Computer Set", Intel Corporation, Jan. 1972.
"MOS/LSI Launches the Low Cost Processor", *IEEE Spectrum*, Gerald Lapidus, Nov. 1972, pp. 33–40.

*Primary Examiner*—Gareth D. Shaw
*Assistant Examiner*—James D. Thomas
*Attorney, Agent, or Firm*—Spencer & Kaye

[57] ABSTRACT

In a circuit arrangement composed of a plurality of highly integrated MOS circuit chips, for use in a data processing device, one chip being an arithmetic and control unit and further chips containing memories, each further chip is also provided with an address register capable of storing a selected memory location address and an address selecting the memory of a selected memory chip for read-out and arranged to count through the successive memory location addresses and to change the memory selecting address after the count reaches the last memory location address, such counting being effected by counting pulses.

6 Claims, 6 Drawing Figures

DATA PROCESSING SYSTEM INCLUDING A PLURALITY OF MEMORY CHIPS EACH PROVIDED WITH ITS OWN ADDRESS REGISTER

BACKGROUND OF THE INVENTION

The present invention relates to a system for producing circuit arrangements of highly integrated chips, particularly according to the MOS technique, for data processing instruments, such an arrangement including an arithmetic and control unit (RSE) chip and at least two memory chips as well as a collecting bus which connects the chips together.

In a circuit arrangement for microprogrammed devices, the functions of the devices, such as, for example, the basic arithmetic functions, keyboard input, printer output, tabulation, interpretation of applicator programs, etc., are controlled by a sequence of the elementary instructions of the microprogram. In the basic design of such a circuit arrangement, one arithmetic and control unit (RSE) is provided as well as one read-only memory (ROM) and one random access memory (RAM). The RSE performs the arithmetic, logic and transfer operations to link its memories and registers, and performs and controls the exchange of information within the entire circuit.

By these operations it is possible, for example, to perform any desired arithmetic operations, to transfer data and control signals to other components or peripheral units, or to receive them from such units, to make logic decisions, and to read out data to and write in data from supplemental memories.

A RAM is required in order to store data, intermediate values, etc., which are to be processed and to have them available for further processing. All arithmetic operations take place between the RAM and a calculating register of the RSE.

The ROM, finally, contains the permanent microprogram which is in constant readiness in that the ROM memory word locations are continuously cyclically addressed in sequence; i.e., the microprogram can be considered to circulate in a rest loop. The microprogram instruction words are then branched out upon the appearance of an input, for example, from the keyboard, at the selected point in the program, whereupon the input is processed according to the microprogram which now is being read out from the ROM.

Simple data processing device, such as, for example, unsophisticated table-model calculators, perform satisfactorily with one ROm for a supply of micro-instructions that can be stored at a sufficiently low fabrication cost on one chip. More sophisticated devices, however, require a larger ROM capacity so that two or more chips are required. In known circuit arrangements of this type the RSE contains an address register, which can, for example, have its content continuously increased by one binary value by counting pulses, which is able to continuously address the individual memory locations in the ROM's. If processing, for example, of an arithmetic program, is to occur, the address register is set by the RSE so that the appropriate microprogram address causes a jump to be made to the associated point in the microprogram and the individual program steps, or instructions, are read out. This includes, subsequent to the transfer address, the continuous switching, of the address register in binary value steps, transmission of each address over the collecting bus and addressing, within the chip, of the corresponding memory location in each ROM chip.

The time required for this solution is rather long, however, and this is particularly serious in MOS circuits where the signal flow is rather slow compared to circuits composed of bipolar components since the time includes, for each individual addressing of the microprogram steps, the partial times relating to the transmission of the address through the bus and addressing of the memory location within the chip.

SUMMARY OF THE INVENTION

It is an object of the present invention to minimize such drawbacks in circuit arrangements of the above-described type, by providing, depending on the specific requirements of such arrangement, two or more chips each including an ROM, with the two chips having an associated microprogram content and being interconnected to cooperate with an RSE in a manner to reduce the required processing time and to simplify the addressing procedure.

This is accomplished by providing each chip which contains a memory with an address register for addressing all of the memory locations, the address word stored in the register being changed in unitary binary value steps by counting pulses, i.e., the register functioning as a counter, and the register being provided with additional bit locations for the selection of further chips which also contain memories.

A particular advantage of the present invention is that the memory content of two or more chips is treated as if it were all contained in one chip. The address registers whose word content can be switched by counting pulses address the memory locations of the ROM in each respective chip separately and in parallel. The additional bit locations, however, contain a bit sequence designating which one of the chips is presently available for readout of its memory contents. Since the bit sequence in these additional bit locations is also switched by the counting pulses, attainment of the final address in the first chip will automatically lead to addressing of the first memory location of the next chip.

If the RSE sends an instruction to read out the contents of a certain memory location, all ROM chips are addressed via the bus; however, only that ROM chip which is being addressed by the contents of the additional register bit locations is the one that is activated and only the memory location addressed in this chip is read out.

Counting proceeds continuously in the address registers. When the ROM of one chip has been completely read out and further program steps from the next chip are to follow, the further addressing of the next chip is accomplished simply by the continued increase in the address word value and without loss of time.

The total time requirement is kept very low because only the time for addressing a memory location within the chip is required and no transmission takes place through the bus. The required circuitry is limited to one address register per ROM chip, which register can have its content continuously switched on by counting pulses. These counting pulses can, for example, be the clock pulse usually provided in such a circuit. The register also contains a few additional bit locations, normally one or two locations, for the selection of the ROM chips.

A further advantage provided by this arrangement is that all ROM chips are completely identical in structure, independent of the number of chips used in a circuit arrangement, which is of course limited by the size of the register. A system constructed in this manner is thus extremely flexible and suited to form circuit arrangements for the most diverse applications.

A further advantage results if the system is provided with a subprogram arrangement and each ROM chip contains, in addition to the one address register, further address registers to accommodate return addresses. In this case it is particularly important that there be available a large contiguous address range which extends over a plurality of chips. In the subprogram technique it is very important that a subprogram located at a certain point in the memory range can be reached by all memory addresses.

Embodiments of the present invention are illustrated in the drawings and will be explained in detail below.

DESCRIPTION OF THE PREFERRED EMBODIMENTS

Figure 1:
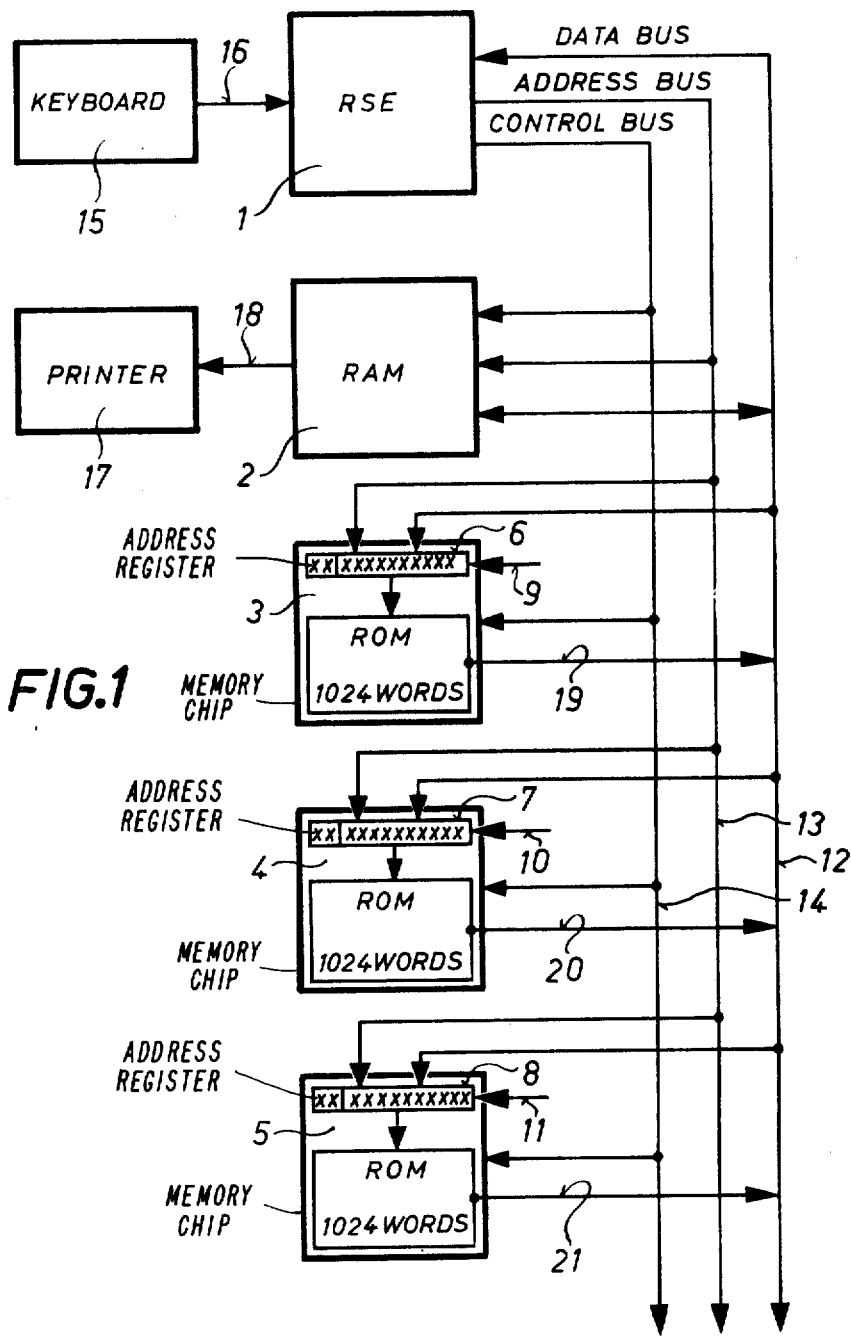
FIGS. 1 and 2 are block circuit diagrams of two preferred embodiments of the invention.

FIG. 1 illustrates a portion of a system composed of five chips 1, 2, 3, 4 and 5, in which chip 1 contains an arithmetic and control unit (RSE), chip 2 contains a random access memory (RAM) and chips 3, 4, 5, each contain a read-only memory (ROM). Each ROM chip 3, 4 and 5 has a memory capacity of 1,024 micro-instruction words so that the micro-instruction supply stored therein amounts to a total of 3,072 words. Each ROM chip 3, 4 and 5 also contains a respective one of address registers 6, 7 and 8, each register having ten bit locations, indicated by crosses, for addressing the respective 1,024 word locations of the memory region of its respective chip 3, 4 or 5, as well as two additional locations, indicated by two crosses, provided to contain a bit sequence indicating which of ROM chips 3, 4 and 5 is to be selected for read-out.

The word contained in each of these three address registers 6, 7 and 8 can be continuously switched from that designating one ROM memory location to the next by counting pulses, applied via lines 9, 10 and 11 connected to the right end of registers 6, 7 and 8, respectively. A data bus 12, an address bus 13 and a control bus 14, all forming part of the collecting bus, start at the RSE chip 1, each of the buses 12, 13 and 14 having a plurality of lines and being connected with chips 2, 3, 4 and 5 of the circuit arrangement. The address registers 6, 7 and 8 can also be set by address word signals transmitted from RSE chip 1 via data bus 12 and address bus 13.

A keyboard 15 is provided for writing in the data to be processed. This keyboard 15 is connected with the circuit arrangement via a peripheral channel 16 and cooperates with the circuit arrangement in any standard manner not illustrated in detail. A printer 17 is likewise connected to the circuit arrangement for the output of data via a peripheral channel 18 and permits the print-out of final results, intermediate values, stored data and, depending on the purpose for which the system is intended and the corresponding design of the peripheral structure and the microprogram, the print-out of written material.

When the device is started, all address registers, inter alia, of the ROM chips 3, 4 and 5 are set to zero. Counting pulses then fed to the address registers 9, 10 and 11 cause each register to count through a sequence of addresses so that one memory location after the other is addressed in each ROM chip 3, 4 and 5.

If, on the basis of an input to keyboard 15, processing is to take place, a corresponding 12-bit address is conducted from RSE chip 1 via data bus 12 and address bus 13 to the address registers 6, 7 and 8 of all three ROM chips 3, 4, 5. A decoding device, which is not shown in detail, assigns the first 10 address bits from an address register 6, 7 or 8 to a ROM memory location and uses the remaining two bits to select one of the three chips for read-out.

As a result of a control instruction coming through control bus 14 from RSE chip 1, the contents of the addressed memory location are read out and are delivered from the selected chip to data bus 12.

Starting from the address delivered from RSE chip 1, the address registers 6, 7, 8 in all three ROM chips 3, 4, 5 are caused to count through a sequence of address words by counting pulses and in the chip to which the starting address applies, for example, the ROM chip 3, the subsequent microprogram steps required for processing are continuously read out. As soon as the contents of the last memory location which can be addressed by the ten-bit address in ROM chip 3 has been read out, the next counting pulse switches the two-bit address portion on in all three address registers 6, 7 and 8. The ten-bit address portion at this time contains the first address location word so that automatically the first memory location is read out from the ROM chip 4, which ROM is now being addressed by the two-bit address portion. The same process can also take place during transition to the third ROM chip 5.

If the operation ordered by the input from keyboard 15 has been accomplished, for example, by a printout by printer 17, the microprogram is caused to "circulate" in a "rest loop".

The circuits contained in the RSE chip 1 and the RAM chip 2 and the functions performed by them are not part of the present invention and are therefore not explained in detail for the sake of clarity. Their principal purposes have already been discussed earlier herein and various forms which these circuits can have are known in the art. It should be noted, however, that the peripheral channel 16 as well as the peripheral channel 18 cooperate only with the RSE chip, independent of which chip they are physically connected to. The exchange of signals, for example, between the peripheral channel 18 and the RSE chip 1 thus takes place via an "internal wiring" contained within RAM chip 2 and through the bus.

Figure 2:
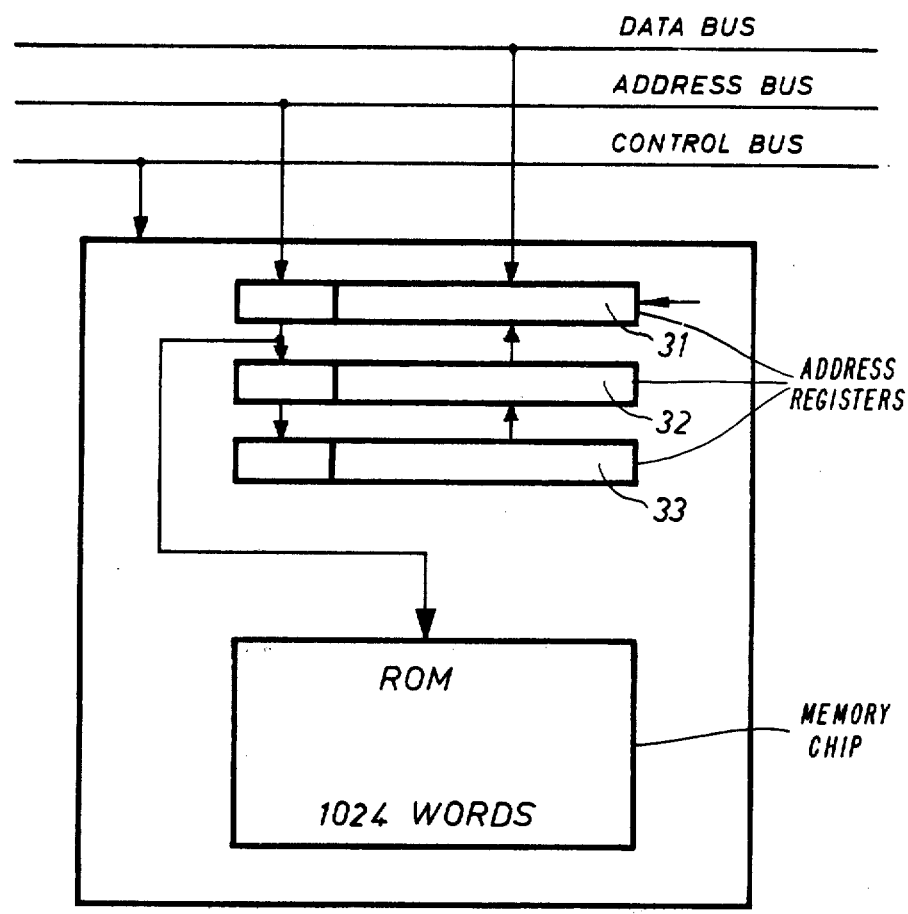

FIG. 2 shows a modified form of construction for each ROM chip 3, 4 and 5 of FIG. 1 in which, instead of a single address register 6, 7 or 8, three address registers 31, 32 and 33 are provided. Further address registers similar to 32 and 33 can also be added. The address register 31 can be caused to count through a sequence of address words and can be set to a starting address word in the same manner as described above for registers 6, 7 and 8 of FIG. 1. Under control of a special transfer instruction, known as a subprogram transfer, the contents of register 32 are processed after those of register 33 and the contents of register 31 are processed after those of register 32 and then register 31 is reset. This saves the address (return address) for return to the program portion which was being processed before the transfer to the subprogram took place.

The return to the program processed before the transfer to the subprogram is effected by transferring the contents of register 32 to register 31 and the contents of register 33 to register 32. Register 33, and possibly following registers, serve to enclose further subprogram transfers in a first subprogram transfer.

Figure 3:
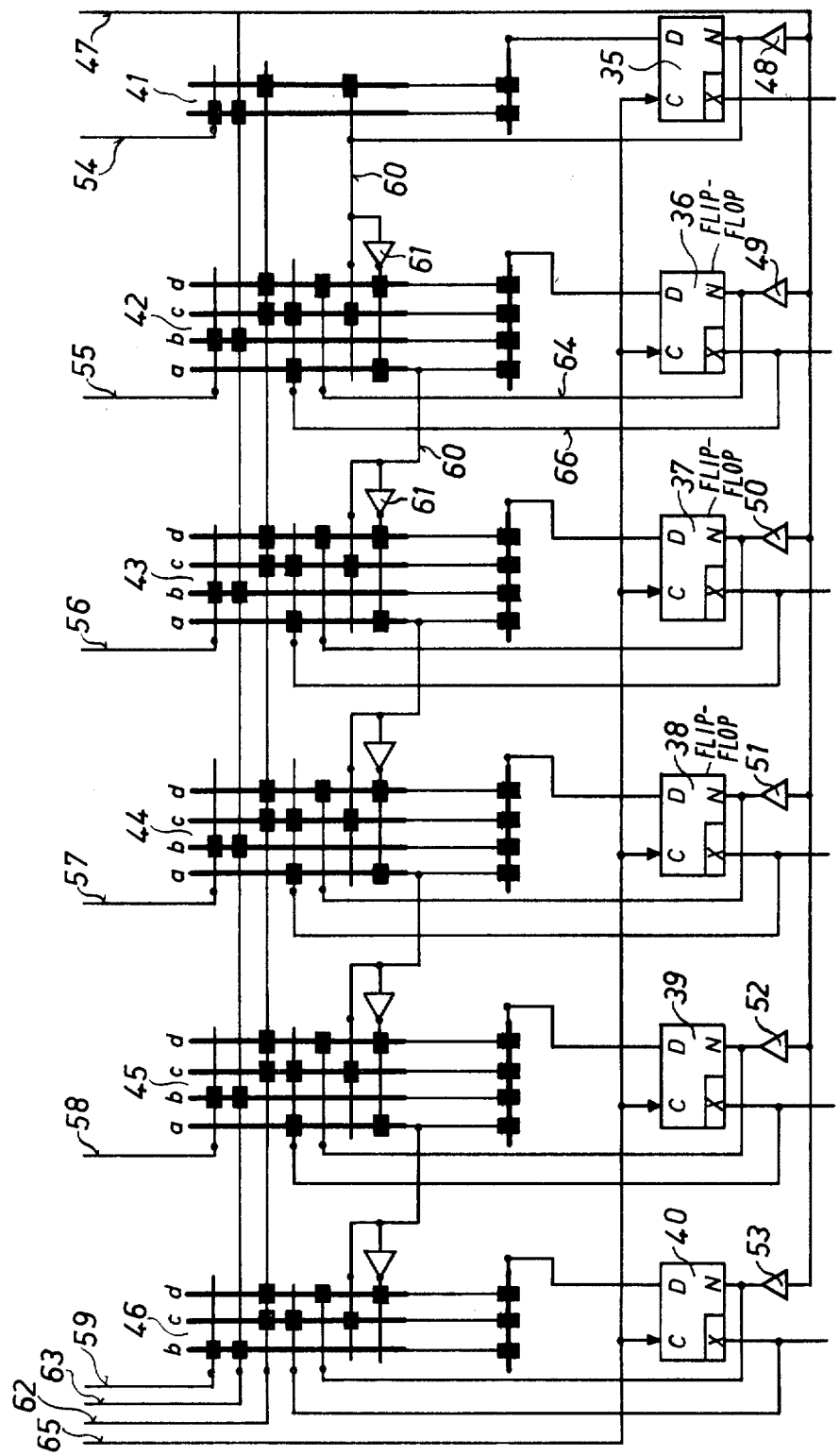
FIG. 3 is a block circuit diagram of one embodiment of an address register of a memory chip of FIG. 1.

FIG. 3 shows the first six locations of a settable and countable address register in a memory chip, e.g. in memory chip 3 of FIG. 1. Storage of the bit values identifying address locations 1 to 6 is effected in flip-flops 35 to 40, respectively. Each of these flip-flops is of a known type in which the transfer of information present at its input D is effected in synchronism with a clock pulse applied at its input C. The thus stored information is available at output X of each respective flip-flop 35 to 40. Also provided at N is an inverted output at which appears the complement of the output signal at X. Each flip-flop 35 to 40 has connected ahead of it the actual setting and counting logic in the form of a respective one of matrices 41 to 46. These are ROM matrices executing the logic function NOR—NOR. The defined output state of flip-flops 35 to 40, upon the application of the supply voltage, is controlled by a signal (e.g. of −5 volt) fed in via line 47. This signal thus imparts, via inverters 48 to 53, the potential of 0 volt to the N outputs of flip-flops 35 to 40. All of the flip-flops 35 to 40 are thus set to their 1 state.

The outputs X provide the six lowermost bits of the address. In this embodiment, these outputs carry a voltage of −5-volt after switching on which, in logic terms, corresponds to 1 states.

A jump address is transmitted in inverted form to the ROM 3, 4 or 5 of FIG. 1 from the RSE chip 1 of FIG. 1 via the data bus, i.e. the binary jump address O corresponds to 1 signals at the data bus, which bus is composed of lines 54 to 59. Since the flip-flops 35 to 40 also take over the inverted addresses, the logic binary address O corresponds to 1 states in flip-flops 35 to 40. This is identical with the output states when the system is switched on. Due to the inverted states, the logic binary address in fact addresses the highest valued address in, for example, the ROM memory in a memory chip.

The logic function of the control matrices 41 to 46 will be described in detail for matrix 42 which is associated with bit location 2 of the address.

Matrix 42 comprises two NOR stages, of which the first stage is provided with four so-called control terms $a, b, c, d$, and the second stage is provided with a control term $e$, and constitutes a NOR—NOR logic. Each control term $a$ through $e$ constitutes a NOR circuit, the black rectangles at the points of intersection between control terms and the lines perpendicular thereto representing the inputs of the lines into the respective NOR circuit.

Control term $b$ controls the transfer of the bit value in location 2 of the address from the data bus line 55 into the flip-flop 36. Terms $c$ and $d$ constitute the counting logic for bit location 2. Term $a$ is a transfer term and furnishes a negative potential to the next-higher register location 37 when the preceding register locations 35 and 36 are in their zero state. The state of flip-flop 36 is transmitted from its output X via line 66 to the control term $a$.

This transfer signal from term $a$, together with the state of flip-flop 37, forms the transfer signal for register location 38, the transfer signal for location 38 together with the position of flip-flop 38 forms the transfer signal for register location 39, etc. This serial transfer process is effected to the sixth bit location. The transfer from, for example, matrix 42 to matrix 43 is effected by the output of the control term $a$ matrix 42 via line 60 and inverter 61 of matrix 43. Such a serial transfer formation via the inverter chain from matrix to matrix is known by the term "ripple carry".

The counter and transfer control is effected by means of enabling signals applied to lines 62 and 63. A signal of 0 volt at line 63 activates the control terms $b$ of the matrices and effects the switching through of the information from lines 54 to 59 of the data bus into the flip-flops 35 to 40. A control signal of 0 volt to line 62 activates the counter control terms $c$ and $d$ of the matrices. The counter control terms $c$ and $d$ receive their information from the state of the respectively associated flip-flop, e.g. in the example of matrix 42 via lines 66 and 64, and from the transfer condition, via the respective line 60 and inverter 61, formed from the preceding stages.

The matrix terms $c$ and $d$ constitute — when considered through all stages — an adding mechanism for adding "minus 1". The information, reduced by 1, is transferred to the register by a transfer clock pulse applied to inputs C of flip-flops 35 to 40 via line 65.

From the viewpoint of the utilization of the unit, the settable and countable address register is treated as an upward counter, whereas from the technical viewpoint discussed in connection with this embodiment, as mentioned above, it actually is a downward counter due to the inverted data transfer through the data bus.

Figure 4:
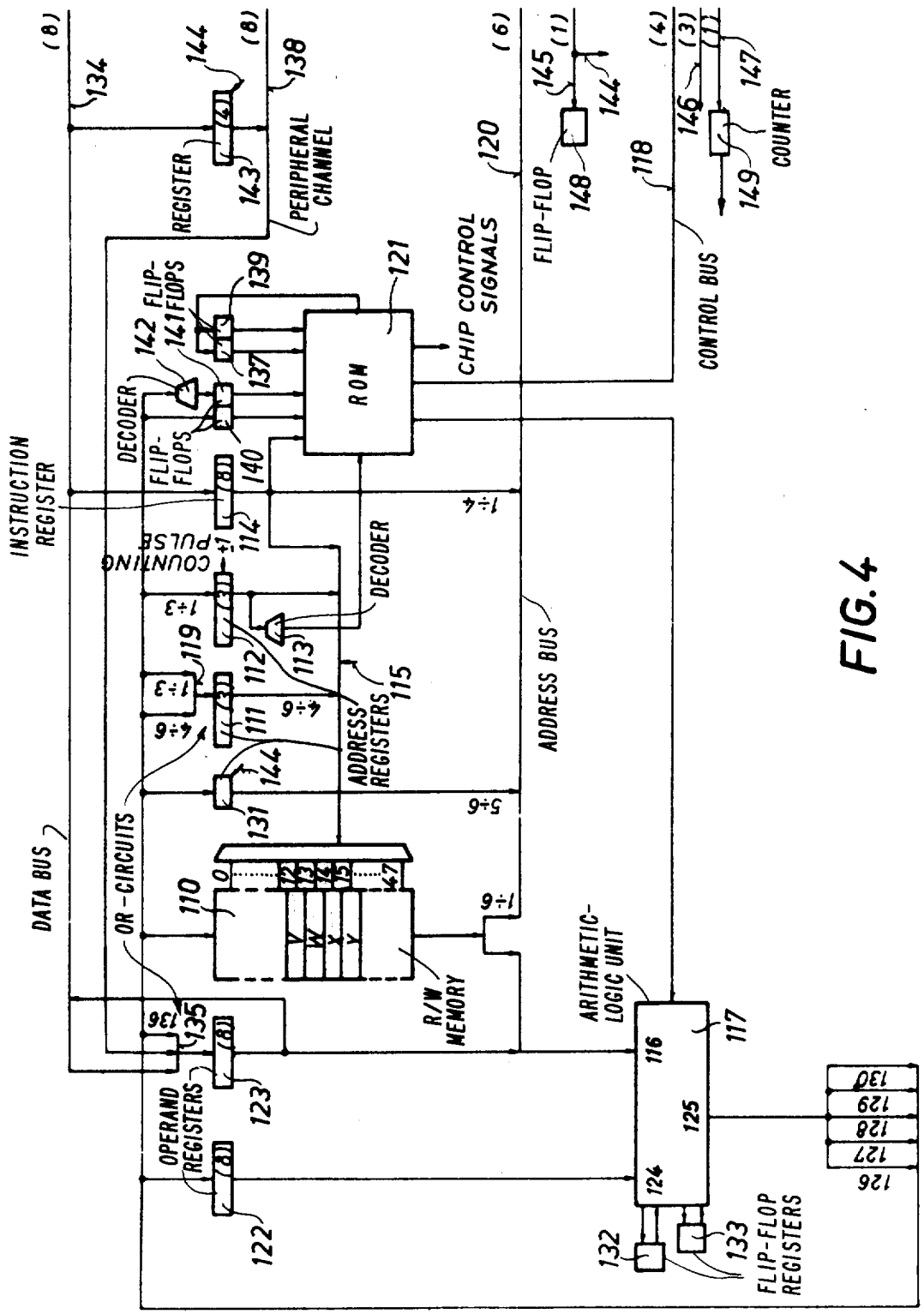
FIG. 4 is a block circuit diagram of one embodiment of RSE unit 1 of FIG. 1.
Figure 5:
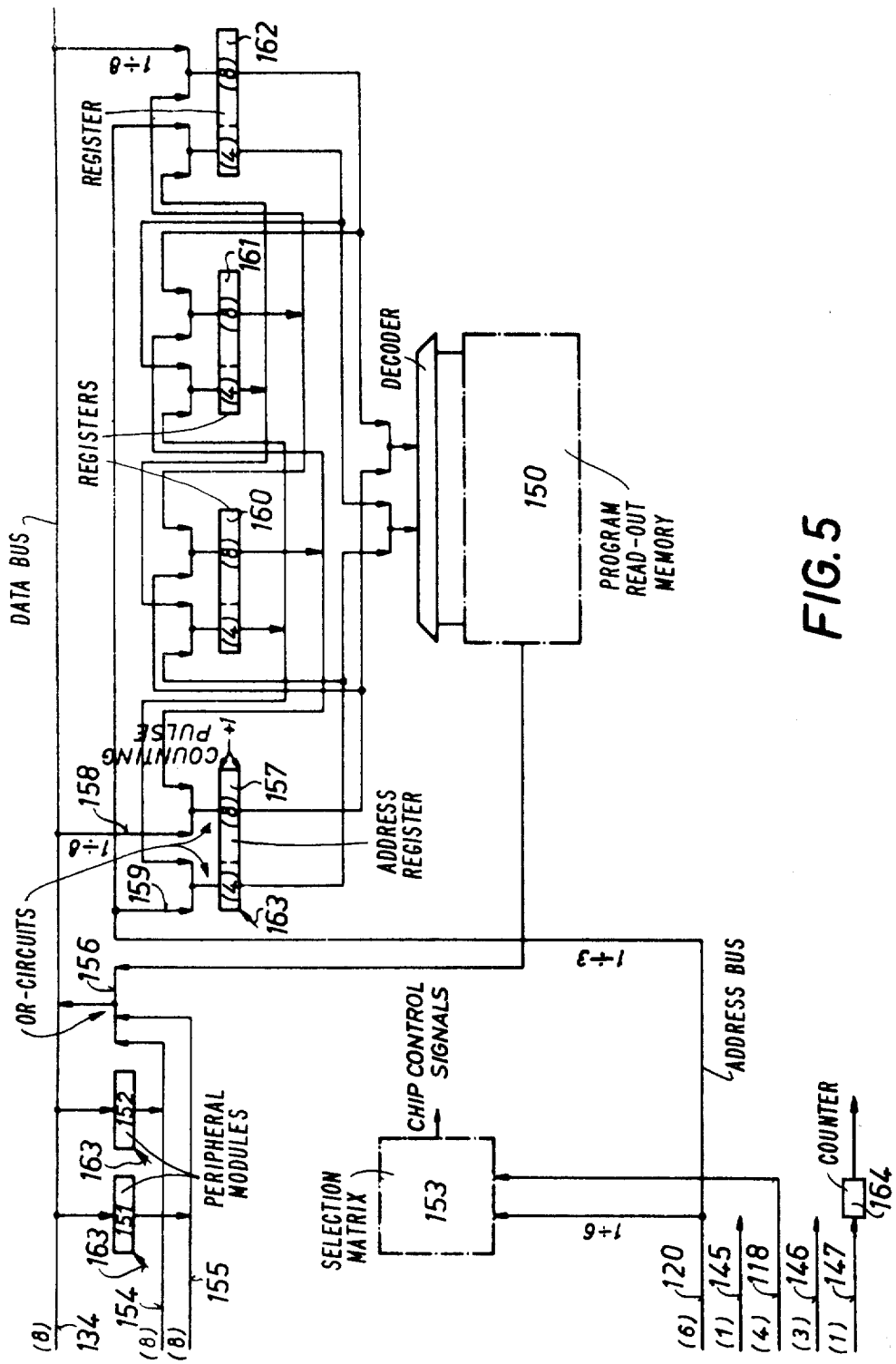
FIG. 5 is a block circuit diagram of one embodiment of one of the chips of FIG. 1.

Every type of data transmission in the system is under the control of the RSE unit. For this purpose, a control bus is provided and the RSE unit transmits control instructions through its lines to the memory chips. The operation of an assembly comprising an RSE chip and a memory chip will be described with reference to a particular embodiment shown in FIGS. 4 and 5, which also illustrate the control sequence. These figures correspond to FIGS. 8 and 9 of our copending U.S. application Ser. No. 535,088, filed Dec. 20, 1974. The embodiment shown in FIGS. 4 and 5 is intended to be constituted as a modular structure; i.e. regarding the address, the groups on the chips comprise various modules, such as, for example, ROM modules, RAM modules, or peripheral modules. The embodiment of FIGS. 4 and 5 is provided with ROM modules and peripheral modules. All modules are connected together via the module bus which comprises the data bus, already described in connection with FIG. 1, the address bus and the control bus and is additionally provided with voltage supply, clock pulse and starting state lines (which are not shown in FIG. 1). Every chip on which modules are disposed is also provided with peripheral terminals which are connected to peripheral channels on the chips.

The memory chip of FIG. 5, which will be identified hereafter as the PSE unit, has an address capacity of four memory modules with 256 bytes each as well as two peripheral modules. The term "byte" means a group of bits, forming together a data word. Of course further memory chips can be connected to the RSE unit and the module bus, as shown in FIG. 1, which comprise in addition to peripheral modules, either ROM modules, RAM modules, or a combination thereof.

FIG. 4 is a block circuit diagram of one embodiment of the arithmetic and control unit RSE of FIG. 1. The read/write memory 110 of the RSE unit in this embodiment is designed so that 48 words containing 8 bits each can be stored therein and can be either written in or read out of this read/write memory 110.

In order to address one of the maximum of 48 memory cells, a six-digit binary address is required. This binary address is furnished by address registers 111 and 112. Register 111 stores the three highest-valued address bits, while register 112 stores the three lowest-valued address bits. Registers 111 and 112 are flip-flop registers and each includes three flip-flops as indicated by the numbers in parentheses in the address registers 111 and 112 in FIG. 4. The data paths from the address registers 111 112 to the read/write memory 110 are indentified as 4 ÷ 6 and 1 ÷ 3, respectively, corresponding to the binary value of the address of read/write memory 110. The binary contents of the address registers 111 and 112 can be changed by the running program. The address registers 111 and 112 are thus suited for the indirect addressing of the memory cells.

Address register 112 is a three-stage binary counter, respectively, and permits the sequential addressing of a data field. The organization of the read/write memory 110 may also be understood to mean that the address register 111 selects one of the maximum of six data fields while address register 112 selects one word of the maximum of eight words of the selected data field.

A decoder 113 furnishes a control signal to ROM 121 of the instruction control if it has a binary content equal to 7. This makes it possible to interrogate, with a defined jump order, the end of a data field. The bits 1 ÷ 4 of an instruction register 114 form a second address path to the read/write memory 110. By giving an explicit address in the instruction it is thus possible to address the memory cell containing addresses 0 to 15 directly over this path. In fact, however, only addresses 0 to 11 are being used. Address 12, which is assigned to memory cell V, indicates that indirect addressing of a memory cell is to be effected from address registers 111 and 112. Address 13, which is assigned to memory cell W, indicates indirect addressing and subsequent modification of the contents of the address register 112 by downward counting. Finally, address 14 which is assigned to memory cell X, indicates indirect addressing and subsequent upward counting of the contents of the address register 112. Direct addressing of memory cells V, W, X and Y which are associated with addresses 12 to 15, is also possible. The addressing is effected implicitly, the address is decoded from the instruction code of the respective instructions, as indicated by arrow 115. After selection of a memory cell in the above-described manner, this cell is read out and reaches the operand input 116 of an arithmetic-logic linkage unit 117. The results formed in the arithmetic-logic linkage unit 117 can also be written back into the read/write memory 110 via eight lines of the data path 128 or can reach address registers 111 or 112 as new addresses.

The legend 1 ÷ 3 ahead of the address register 112 indicates that the first, second and third bits, or bits 1, 2 and 3, of output 125 of the arithmetic-logic linkage unit 117 are transferred. An OR circuit 119 is indicated in front of address register 111. Either the bits 1÷ 3 of output 125 of the arithmetic-logic linkage unit 117 or the bits 4 ÷ 6 are transferred to the address register 111. The memory cells X and Y of the read/write memory 110 serve to indirectly address a read-out memory, a read/write memory or the peripheral modules of further chips. For this purpose the bits 1 ÷ 6 of memory cells X or Y are connected to an address bus 120.

The arithmetic portion of the unit RSE includes the arithmetic-logic linkage unit 117 in which the actual arithmetic functions are performed and the two operand registers 122 and 123. These are eight-digit flip-flop registers, indicated by the numeral 8 in parentheses. The arithmetic-logic linkage unit 117 links two operands which are present at inputs 116 and 124. Their output 125 is connected to a shifting mechanism, here represented by five different parallel data paths 126 to 130, the path 128 forming the RSE internal result bus. Results formed in this manner can be transferred selectively either to the operand registers 122, 123 or to the read/write 110 or, if they are addresses, to the address registers 111, 112 or 131.

The operand input 124 of the arithmetic-logic linkage unit 117 is principally fed by the accumulator formed by the operand register 122. The feeding of operands to the operand input 116 is effected selectively from the buffer register represented by operand register 123 or from the read/write memory 110. The type of linkage to be effected between the two operands 116 and 124 is determined by the instruction presently being followed and stored in the instruction register 114. The contents of instruction register 114 is fed for this purpose to ROM 121 of the instruction control which produces therefrom the required control signals for the arithmetic-logic linkage unit 117. The two flip-flop registers 132 and 133 store the binary transfers which occur and control the correction addition in decimal operations.

The buffer register 123 serves as an intermediate store in the transmission of data between the RSE chip and an external chip with a ROM, RAM or peripheral module. Data to be transferred into the RSE unit travel through the data bus 134 and the OR circuit 135 in front of the buffer register 123 to the buffer register 123, while data to be emitted by the RSE unit travel from the buffer register 123 through the data bus 134 to the modules on external chips. The right-hand data path 136 of the OR circuit 135 feeds the buffer register 123 with all data to be emitted. The peripheral channel 138 of the RSE unit opens into the center data path of the OR circuit. Peripheral data to be fed in through this channel come to the buffer register and from there via the arithmetic-logic linkage unit 117 to the accumulator 122 of the system.

A condition flip-flop 140 is set if a linkage result contains a zero in bit 8 which is the same as a positive number in binary representation in the scale-of-two complement. A second condition flip-flop 141 is set if the linkage result equals zero. The decoder 142 required for this purpose is indicated at the input of the condition flip-flops 141.

The control mechanism addresses, via address bus lines 120, the module of external chips which is to effect an exchange of data with the RSE. The instructions required for this purpose are furnished by the instruction to be followed, which is presently in instruction register 114. ROM 121 of the instruction control decodes the binary contents of instruction register 114 for this purpose and produces therefrom all the required control signals.

There are two groups of control signals: the RSE internal control values; and the signals for controlling the functions of the memory chips, and these four control signals are fed to these chips via control bus 118. Briefly speaking, the control mechanism controls the alternating read-out and performance of the instructions. To read out an instruction, the contents of a flip-flop register 131 is switched to three address bus lines 120. This results in several possible combinations which define the so-called module regions. In the present embodiment, one module region has the ROM capacity of 4096 instructions and physically covers four chips. The detailed procedure of selecting an instruction word in the memory chips will be described below in conjunction with the description of the PSE block circuit diagram of FIG. 5.

In the circuit of FIG. 4, the active memory module transfers the selected instruction over data bus 134 into the instruction register 114 and into the buffer register 123 of the RSE unit. Thus the instruction reading cycle is complete and processing of the instruction begins. The operands required for this purpose in most cases are present in the accumulator 122 and in the read/write memory 110 of the RSE unit and thus permit the instructions to be internally processed in the RSE unit. The data bus 134 remain unused in this case so that the next instruction can be read in parallel with the processing of the current instruction.

The RSE unit has a peripheral channel 138 for feeding in and reading out data bits. In order to read out the data bits, the contents of the accumulator 122 is brought through the arithmetic-logic linkage unit 117 into the buffer register 223, before it is transferred via data bus 134 into a read-out register 143.

The lines of the peripheral channel can be used, for example, via amplifiers, to operate lamps or magnetic stations of peripheral instruments.

When the system is switched on the output register 143 is automatically set to zero by a "start" signal, indicated by the arrow 144. It is thus assured that when the system is switched on, connected peripheral units will not inadvertently start functioning. The "start" signal will be explained in detail below. The flip-flop states of the output register 143 can be interrogated at any time via the input path 138 to the buffer register 123.

The points of interconnection for the RSE unit can be seen at the right edge of FIG. 4. The numeral indications in parentheses refer to the number of contacts associated with the respective illustrated interconnection point. The system points of interconnection which are common to all chips, the so-called module bus, includes the eight contacts of the data bus 134, the six contacts of the address bus 120, the four contacts of the control bus 118, the "start" signal 145 contact, the three operating voltage contacts 146 and the one system clock pulse contact 147. The five last-mentioned contacts (145, 146 and 147) are not shown in FIGS. 1 and 2. This brings the total number of contact terminals in the module bus to 23.

The data bus 134 is designed to be bidirectional, i.e. the transfer of data is possible in both directions. The data (bytes) are transferred serially, while the bits of a byte are transferred in parallel. The address bus 120 serves the RSE unit to select the module on other chips with which data are to be exchanged via data bus 134. The required control instruction for the selected module, i.e. the directions of transfer, selection or register and type of data to be transferred (characters, instructions, addresses) are furnished by the RSE unit via the control bus 118.

The "start" signal 144, when the system is switched on, constitutes the defined program start at the instruction address 0. The system requires a signal change from 0 to a negative voltage once the voltage supply has reached its minimum operating values. The signal change sets a synchronization flip-flop 148 and starts the program sequence. The "start" signal 144 also erases the RSE address register 131 as well as the address registers of all memory chips. With this measure the start of the program is assured at the instruction address 0.

In order to provide a time sequence control, the chips require the system clock pulse. The system clock pulse acts in every chip on a two-stage binary counter 149 from which four counting states can be decoded. The four counting states form the so-called machine cycle. The performance of an instruction requires one or up to a maximum of four machine cycles.

FIG. 5 is a block circuit diagram of one embodiment of one of the memory chips of FIG. 1, i.e. a program memory unit PSE or ROM. Such a PSE chip includes a program read-out memory 150, which in the present example is assumed to have a capacity of 1024 bytes of 8 bits each. The read-out memory 150 serves to store microinstructions, macroinstructions and unvarying data (e.g., numbers, text symbols, addresses, code tables). This readout memory 150 is divided, regarding its addresses, into four modules with 256 bytes each. The first six locations of address register 157 are described in detail in connection with FIG. 3.

The PSE unit also includes two peripheral modules 151 and 152 which do not relate directly to the contribution of the invention and will not be described in detail herein.

The memory cells of the read-out memory 150 are addressed according to the following addressing scheme. There exists the possibility of addressing up to 64 memory modules through the six lines of the address bus 120. The selection of the bytes in a memory module is effected by a twelve-bit address register 157 associated with the memory module. Bits 1–8 address the bytes within one memory module. The module itself is selected by bits 9 and 10. Thus the selection of the proper instruction has been effected within a PSE chip. Regarding programming techniques, it is advantageous, however, to define a larger region, e.g. 4096 bytes. This corresponds to the capacity of four physical PSE chips. Within these pages it is possible to have a linear program sequence and with a 12-bit jump address every byte can be addressed.

The selection of which one of the four PSE chips becomes active is made by bits 11 and 12 in address register 157. The sixteen memory modules of four PSE chips belonging to a memory region form a so-called 4k memory module region (4096 bytes). The selection of one of a plurality of regions, if more than one region is provided, is effected by the RSE unit via the address bus 120, lines 5 and 6, to selection matrix 153. The selection process is not a novel feature of the invention and, being well known in the art, will not be described in detail herein.

There now follows a description of the PSE functions during the performance of a jump instruction, i.e. branching to any desired instruction address within a module region. The performance of a linear program is effected by sequential addressing of the individual instructions. For this purpose the address contents of the register 157 is continuously increased by 1. The address register 157 performs the function of a 12-bit upward counter. If a byte with such an address contains a jump instruction, the linear program sequence is interrupted and the jump address contained in the instruction is transferred to address register 157. A jump instruction includes two bytes, which are stored in read-out memory 150 in ascending order.

The performance of an instruction requires three machine cycles. In the first cycle the first half of the instruction is transferred through OR circuit 156 and data bus 134 to the instruction register 114 of the RSE unit. This first half of the instruction contains in its bits 1–4 the upper four bits of the jump address. In the second machine cycle the second half of the instruction of the jump instruction is transferred to buffer register 123 of the RSE unit in the same manner. During the third machine cycle, bits 1–8 of the jump address are transferred from buffer register 123 via data bus 134 to the lower eight digits of register 157 of the PSE unit. In parallel therewith the three highest-valued bits are transferred from instruction register 114 of the RSE unit via the address bus 120, lines 1 to 4. Four PSE chips, belonging to one 4k module region, store this address in their address registers 157. In the block circuit diagram of the PSE unit the data paths 158 for the lower bits 1 ÷ 8 and the data paths 159 for the upper bits 9 ÷ 12 are shown separately. The number of bits (corresponding to the number of lines) is given in parentheses. The number (8) in address register 157 represents the eight bits of the address for selection of a byte in the selected memory module. The parenthetical indication (4) in the address register 157 represents the binary addresses 9–12 for selecting a memory module of the module region.

Registers 160, 161 and 162 are also 12-bit flip-flop registers and together with register 157 form the so-called address stack, or return address register, as shown in simplified form in FIG. 2. The address stack serves to receive the return addresses in the case of subprogram jumps. It stores, in addition to the instruction address for the running program, up to 3 return addresses for a maximum of three subprogram levels. If the running program (which is addressed by register 157) is a subprogram, register 160 receives the interruption address of the higher-level program, increased by 1. If the interrupted program was also a subprogram, register 161 receives the interruption address of the next-higher program level, etc. That means, when a jump address is transferred into register 157, its contents, which has been increased by one, is transferred to register 160, the contents of register 160 moves to register 161 and the contents of register 161 moves to register 162. The corresponding data paths can be found in the block circuit diagram of FIG. 5.

Upon completion of the subprogram, return to the interrupted, higher-level program is effected by a shift in the stack in the opposite direction. The contents of register 162 is transferred to register 161, the contents of register 161 to register 160 and the contents of register 160 to register 157. With the aid of this address stack a maximum of three subprogram levels are possible in addition to the main program level.

A second addressing path exists for program read-out memory 150 via address register 162. It is shown on the right side of the block circuit diagram of FIG. 5. Register 162 can be loaded directly from data bus 134, and via lines 1 ÷ 4 of address 120, with a 12-bit address. Register 152 is used to address constant data which may be disposed in the same program read-out memory 150 as the controlling program which is addressed by register 157. The reading out of unvarying data is effected over the same ath as the reading out of instructions.

The points of interconnection of the PSE unit can be seen at the left margin of FIG. 5. The numerical indications in parentheses relate also to the number of contacts of the respective partial points of interconnection. Thus there are — as for the RSE unit — eight contacts for the data bus 134, six contacts for the address bus 120, four contacts for the control bus 118, one contact for the "start" signal 144, three contacts for the operating voltages 146 and one contact for the system clock pulse 147. In the PSE unit the "start" signal 144 sets the address register 157 as well as the discharge registers 151, 152 to address 0 at the start of the program, which is indicated by the arrows 163. In this PSE unit the system clock pulse 147 also acts on a two-stage binary counter 164 from which can be decoded four counting states which form the machine cycle.

The above shows that any type of data transmission can take place in the system under the control of the RSE unit and that the instructions to the connected modules are transmitted via the four control lines of the control bus. The module address transmitted by the RSE unit selects a module which decodes from the applied control instructions all internal control parameters, such as counting and transfer pulses. The control bus carries, in its four control lines, the control signals which will be identified as I–IV hereafter. The function of the control signals will be described below with the aid of the following Table.

Table

| Control signal | | | | Functions Performed When an ROM Module is Addressed |
|---|---|---|---|---|
| I | II | III | IV | |
| 0 | 0 | 0 | 0 | address instruction |
| 0 | 0 | 0 | 1 | |
| 0 | 0 | 1 | 0 | read address register (162) |
| 0 | 0 | 1 | 1 | |
| 0 | 1 | 0 | 0 | No Operation |
| 0 | 1 | 0 | 1 | jump back to subprogram |
| 0 | 1 | 1 | 0 | No Operation |
| 0 | 1 | 1 | 1 | |
| 1 | 0 | 0 | 0 | No Operation |
| 1 | 0 | 0 | 1 | |
| 1 | 0 | 1 | 0 | |
| 1 | 0 | 1 | 1 | |
| 1 | 1 | 0 | 0 | Address → address register (157) |

Table-continued

| Control signal | | | | Functions Performed When an ROM Module is Addressed |
|---|---|---|---|---|
| I | II | III | IV | |
| 1 | 1 | 0 | 1 | Address → address register (157) and jump to subprogram |
| 1 | 1 | 1 | 0 | Address → address register (162) |
| 1 | 1 | 1 | 1 | |

Control signal I in the first control line controls the signal transmission direction. A logic 0 means input into the RSE unit, a logic 1 means output from the RSE unit. Control signal II in the second control line identifies the nature of the signal, or data, transmitted through the data bus. If the signal is a logic 1, the transmitted data relate to an address. In all other cases this signal is a logic 0. Control signal III in the third control line selects one of the two address registers 157 or 162, respectively, of FIG. 5. A logic 0 means reference to register 157, a logic 1 reference to register 162. If control signal IV contains a logic 1, a shift is effected in the address stack in the addressed ROM module region.

The combination of the various control signals in the four control lines effects the functions compiled in the above table. In the first column, on the left, the possible control signal combinations are listed; in the second column, on the right is listed the functions which are performed if an ROM module is addressed. The signal combination possibly control the performance of other functions in other modules (RAM, peripheral, etc.) which, however, are not germane to the present example and will therefore not be listed herein.

The control signals are supplied to the lines of the control bus at the beginning of a machine cycle and remain unchanged during the cycle. The transfer of a transmitted information or the shifting within the address stack or counting of a countable address register takes place each time at the beginning of the next machine cycle.

Figure 6:
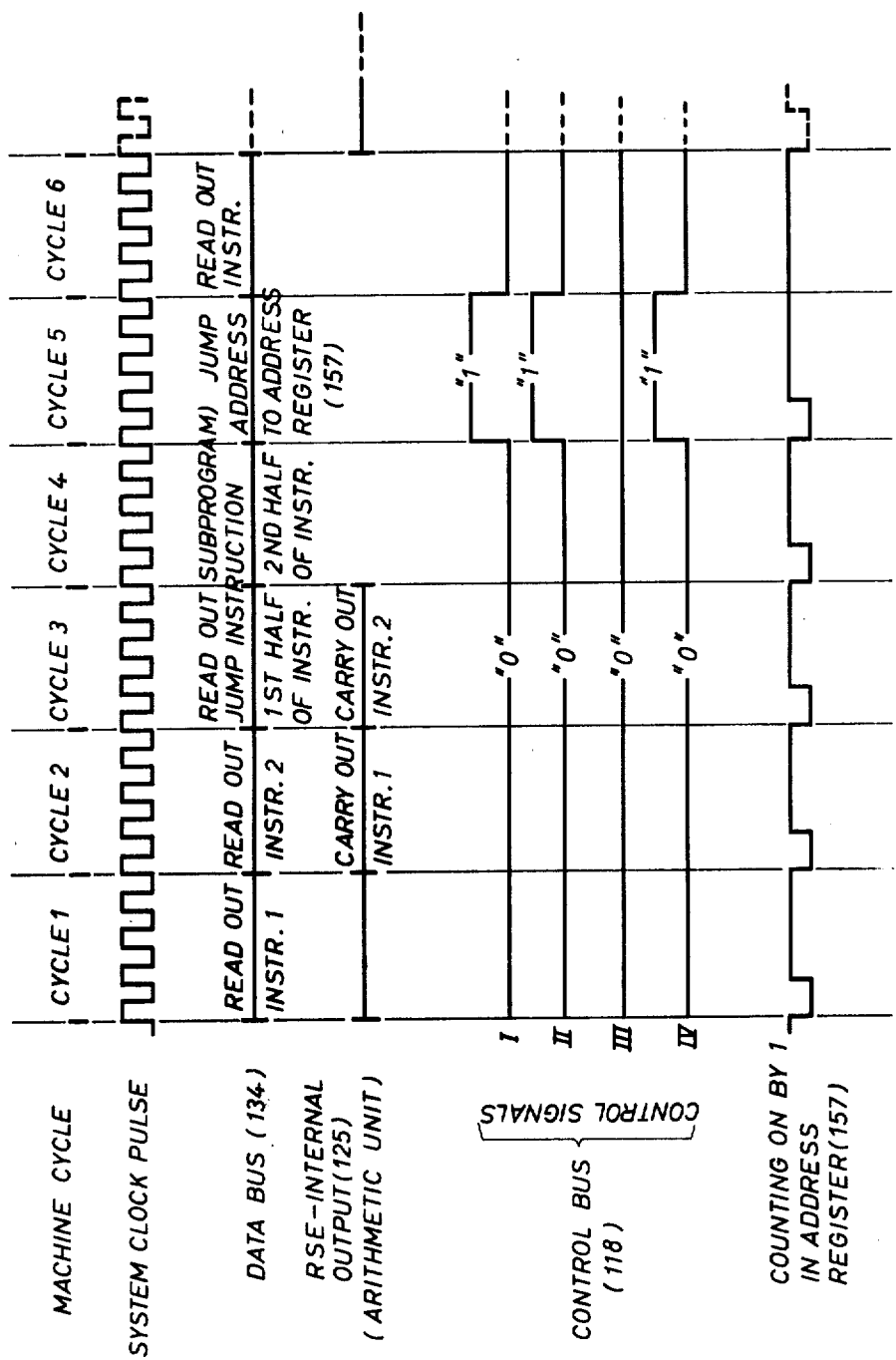
FIG. 6 is a waveform diagram illustrating the operation of a system incorporating the circuits shown in FIGS. 4 and 5.

FIG. 6 shows the time sequential control in a system provided, for example, with the RSE unit of FIG. 4 and the PSE unit of FIG. 5. The uppermost line shoes the system clock pulse train which in the present example is assumed to be at a rate of 800kHz. The machine cycle is assumed to have a duration of 5µs so that a cycle consists of four oscillations of the system clock pulse. In the second line from the top of FIG. 6, relating to the data bus, there are designated various consecutive functions, which correspond to the consecutive machine cycles, each function lasting one cycle. Thus, instructions are read out during cycles 1 and 2, the first and second instruction halves of a longer subprogram jump instruction are read out during cycles 3 and 4 and the jump instruction is carried out during the fifth cycle, i.e. the jump address is transferred to register 157 of FIG. 5, the previous contents of register 157 is transferred to register 160, the contents of register 160 is transferred to register 161 and the contents of register 161 is transferred to register 162. During cycle 6 the instruction adressed by the jump address is read out.

In the third line from the top of FIG. 6, the output from arithmetic unit 125 of FIG. 4 is shown. During the first cycle a previously read-out instruction is carried out, while during the second machine cycle, instruction 1 is carried out and during the third machine cycle instruction 2 is carried out. Thereafter no further instruction is to be carried out in the arithmetic unit of the function diagram of FIG. 6.

The next four lines of the diagram represent the control signals in the four lines of the control bus. According to the scheme of the above Table, all four control lines carry the logic signal 0 until the end of the fourth machine cycle and this signal controls an instruction read-out in the ROM module. During the fifth machine cycle, each of the control signals I, II and IV presents a logic 1 which signal III presents a logic 0. According to the scheme of the Table, the address is written into register 157 and a subprogram jump is carried out. The lowermost line of FIG. 6 shows the counting pulses of register 157. It can be seen that during the linear sequence the address register 157 is counted on by 1 while the continuous counting is interrupted by a jump instruction. Although the specification mentions only read-only memories (ROM's) in chips 3, 4 and 5, it is of course also possible to use random access memories (RAM's) instead.

It will be understood that the above description of the present invention is susceptible to various modifications, changes and adaptations, and the same are intended to be comprehended within the meaning and range of equivalents of the appended claims.

We claim:

1. In a circuit arrangement composed of a plurality of chips containing highly integrated circuit components for use in a data processing device, one said chip containing components interconnected to form an arithmetic and control unit for performing the arithmetic operations and controlling the operation of said arrangement and at least two others of said chips each constituting a memory chip containing components defining a memory having a plurality of addressable "memory locations, said arrangement also including a plurality of conductors interconnecting said chips and defining a collecting bus, the improvement wherein each said memory chip further includes components interconnected to define an address register having a first group of address bit locations arranged to contain an address word for addressing any selecing memory location of the memory on its respective memory chip, and having a second group of address bit locations arranged to contain a bit sequence for selecting the memory of one of said memory chips for read-out, there being a respective bit sequence corresponding to ach said memory chip, and each said register having a counting pulse input and being arranged to count through successive memory word addresses in response to pulses applied to its counting pulse input.

2. An arrangement as defined in claim 1 wherein each said register has both of its groups of bit locations inerconnected to have the content of its first group of bit locations count through the addresses of all memory locations of its respective memory and to increase the binary value of the bit sequence contained in its second group of bit locations after there has appeared at its first group of bit locations an address word constituted by the highest binary value which said first group of bit locations is capable of containing.

3. An arrangement as defined in claim 1 wherein said components are MOS components.

4. An arrangement as defined in claim 1 further comprising means connected between said arithmetic and control unit and each said register for supplying signals for setting a selected bit value into each bit location of each said register.

5. An arrangement as defind in claim 4 wherein each said memory is a read-only memory containing successive microprogram instruction words in sequentially addressable memory locations.

6. An arrangement as defined in claim 5 wherein at least one said memory chip further contains a plurality of further address registers for containing return addresses, and connected to said first recited register of said one memory chip for transferring the content of each said further register to said first-recited register upon completion of processing of a respective subprogram.

* * * * *